No. 622,025. Patented Mar. 28, 1899.
I. H. SPENCER.
FLUID PRESSURE REGULATOR.
(Application filed Apr. 9, 1898.)
(No Model.)
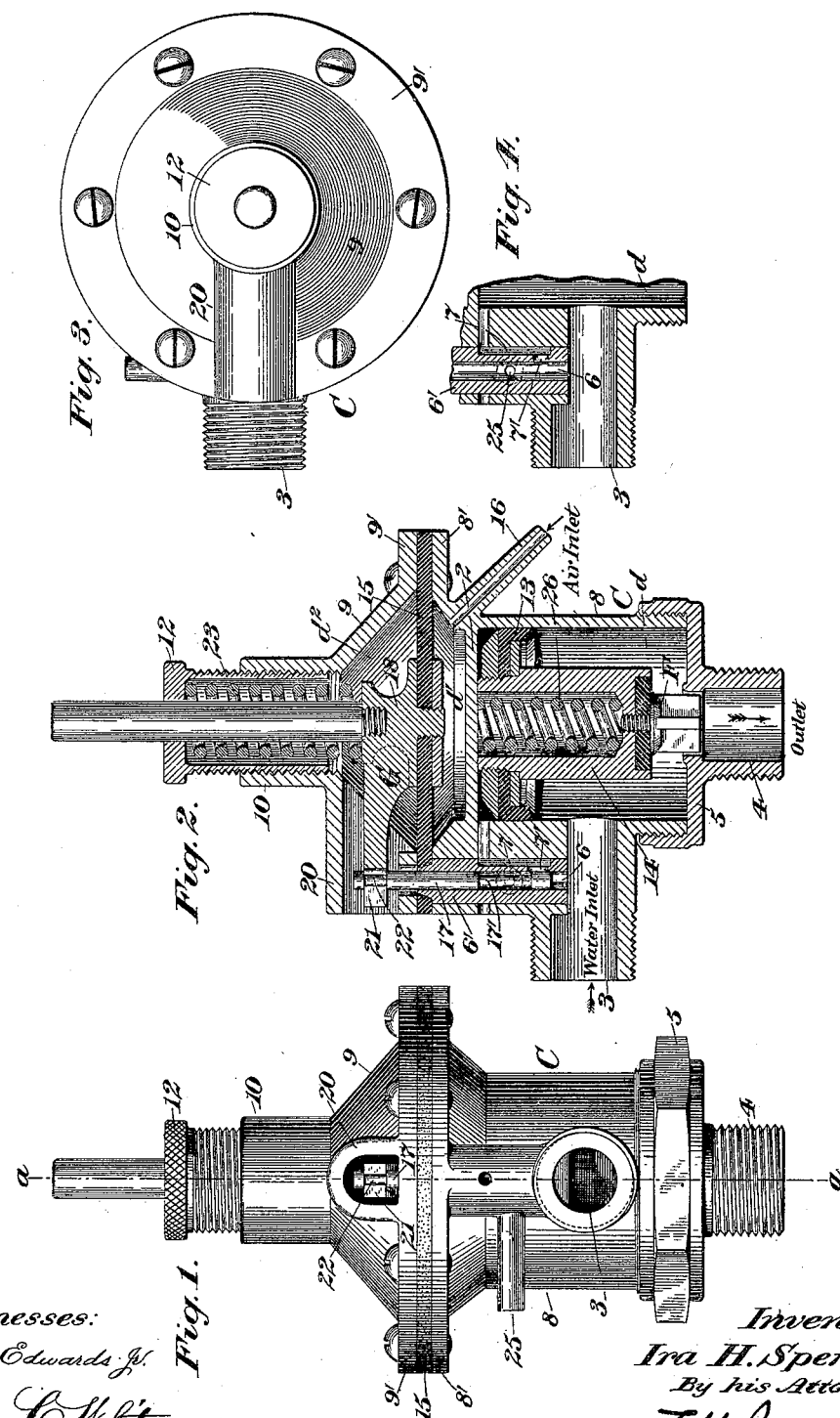
Witnesses:
J. L. Edwards Jr.
Emory C. Whitney
Inventor:
Ira H. Spencer
By his Attorney,
F. H. Richards.
THE NORRIS PETERS CO., PHOTO-LITHO., WASHINGTON, D. C.

United States Patent Office.

IRA H. SPENCER, OF HARTFORD, CONNECTICUT, ASSIGNOR TO THE L. E. RHODES COMPANY, OF SAME PLACE.

FLUID-PRESSURE REGULATOR.

SPECIFICATION forming part of Letters Patent No. 622,025, dated March 28, 1899.

Application filed April 9, 1898. Serial No. 677,037. (No model.)

*To all whom it may concern:*

Be it known that I, IRA H. SPENCER, a citizen of the United States, residing in Hartford, in the county of Hartford and State of Connecticut, have invented certain new and useful Improvements in Fluid-Pressure Regulators, of which the following is a specification.

This invention relates to a fluid-pressure regulator of a class especially adapted for use in connection with an air-compressing pump, an air-brake equipment, &c., an object of my present invention being to furnish a simple, compact, and efficient fluid-pressure regulator effective for automatically arresting the action of a pump when the pressure of fluid exceeds a maximum or predetermined limit and for automatically starting said pump when the compression of fluid falls below said limit and to so construct and organize the parts of the regulator that the motive fluid supplied to the pump will be fully and suddenly cut off upon the slightest increase in pressure of the fluid above the predetermined limit in contradistinction to the usual gradual cutting off of the motive-fluid supply of regulators of ordinary construction.

A further object of the invention is to provide an improved fluid-pressure regulator embodying a main supply chamber or cylinder having a main and an auxiliary supply-conduit of relatively different diameters communicating with opposite ends, respectively, of said cylinder and also having a discharge-conduit, a piston working in said cylinder and embodying a valve for closing the discharge-conduit, a pressure-chamber separated from the main cylinder and having an air-inlet, a flexible diaphragm constituting one wall of the pressure-chamber and controlled in its movements in one direction by the air-pressure in said chamber and controlled in its movements in an opposite direction by a spring having a resistance equal to the maximum or predetermined air-pressure, an auxiliary valve disposed at one side of and in parallelism with the main cylinder and effective for controlling the entrance of motive fluid to said cylinder through the auxiliary conduit, whereby to control the cut-off movement of the primary valve, and an actuating-connector between the secondary valve and flexible diaphragm.

The invention consists, chiefly, in the novel construction and organization of the several parts of the regulator, and particularly in the novel arrangement of the auxiliary supply-conduit and the novel construction and arrangement of the secondary valve, whereby the same is actuated from the diaphragm according to changes in the pressure of fluid in the pressure-chamber and whereby slight vibratory movements of the diaphragm will effect, through the medium of said secondary valve and auxiliary conduit, complete opening or closing movements of the primary valve.

In the drawings accompanying and forming part of this specification, Figure 1 is a side elevation of a fluid-pressure regulator embodying my present improvements. Fig. 2 is a longitudinal section of the regulator, taken on a line corresponding to the dotted line $a\,a$, Fig. 1, showing the parts of said regulator at the left of said line. Fig. 3 is a plan view of the regulator; and Fig. 4 is a sectional view, similar to Fig. 2, of a portion of the casing or shell of the regulator, showing the main supply-conduit and also the auxiliary supply-conduit leading from the main supply-conduit to the piston-cylinder.

Similar characters designate like parts in all the figures of the drawings.

My invention is shown embodied in a fluid-pressure regulator especially adapted for use in connection with a hydraulic air-compressing pump and is intended to control the operation of said pump in accordance with the pressure of air forced by it. It will be understood, however, that said regulator is applicable to a steam-pump or any type of fluid-forcing apparatus.

In the preferred construction and organization thereof (illustrated in the accompanying drawings) the casing or shell C of the fluid-pressure regulator embodies three relatively separated chambers—to wit, a water or supply chamber or cylinder $d$, an air or pressure chamber $d'$, and a spring-chamber $d^2$, shown located substantially in concentric relation one above the other.

The water chamber or cylinder $d$, which is shown separated from the air or pressure chamber $d'$ by a transverse wall or partition 2, formed integral with the casing or shell C, has a main supply-conduit 3 communicating with the interior thereof near one end, a discharge-conduit 4, shown formed in a cap 5, screwed upon the lower end of the cylinder $d$, a secondary-valve chamber 6, communicating with the interior of the supply-conduit 3, and a port-passage or auxiliary supply-conduit 7, communicating at one end with the upper end of the cylinder $d$ and at its opposite end, through a port 7', with the secondary-valve chamber 6.

The casing or shell C of the regulator is shown in the accompanying drawings made in four parts—to wit, a substantially cylindrical main body portion 8, in which are formed the water-chamber or piston-cylinder $d$ and the air-chamber $d'$, and which body portion is shown externally screw-threaded at its lower end and has a flared upper end furnished with a substantially annular flange 8', a flared or substantially conical cap 9, having a substantially annular flange 9', adapted to be secured to the annular flange 8' of the main body portion 8 by screws and having at its upper end a diametrically-reduced cylindrical extension 10, which is internally screw-threaded to receive an adjusting-nut, a cap 5, in which is formed the discharge-conduit 4 and which is screwed upon the lower end of the cylindrical body portion 8, and a preferably hollow adjusting-nut 12, screwed into the cylindrical extension 10 of the cap 9 of the casing C.

Seated in the water chamber or cylinder $d$ is a piston 13, having a preferably hollow stem 14, to the lower end of which is secured a primary valve F, adapted for cutting off communication between the supply and discharge conduits 3 and 4, the piston which actuates said valve having its working strokes between the inner ends of the main supply-conduit 3 and the auxiliary conduit 7, as will be readily understood by reference to Fig. 2 of the drawings.

Secured at its outer end, between the flanges 8' and 9' of the main body portion 8, cap 9, and casing C, is a flexible diaphragm 15, which constitutes one wall of the air or pressure chamber $d'$ and separates said chamber from the spring-chamber $d^2$. Air is admitted to the pressure-chamber below the diaphragm 15 through an air-conduit 16, formed in a boss or projection constituting a part of the main body portion of the casing.

As a simple and convenient means for controlling the valve opening and closing movements of the piston 13 in accordance with the variation in air-pressure within the pressure-chamber $d'$ I have provided a diaphragm-actuated secondary valve 17, shown as a piston-valve, seated for reciprocatory movement in the valve-chamber 6, with its longitudinal axis in parallelism with and at one side the piston-cylinder $d$, said valve 17 having one portion of its stem reduced in diameter and being so disposed as to open and close the port 7' between the valve-chamber 6 and auxiliary supply-conduit 7, according as the diaphragm 15 is moved in one direction by the excessive air-pressure and in the opposite direction by a resistance device, hereinafter described.

The secondary-valve chamber 6 is formed in a bushing 6', securely fitted in an opening formed in one side of the main body portion of the casing C, as shown in Fig. 2, said bushing preferably having the upper end thereof formed conical and extending through a perforation in one side of the flexible diaphragm 15, which diaphragm when the cap 9 is secured in place on the main body portion 8 of the casing forms a tight joint at this point between the casing and bushing 6' and prevents the escape of water around said bushing.

As a means for actuating the piston-valve 17 from the diaphragm I have provided an actuating-connector or secondary-valve actuator (designated in a general way by G) between and connecting the outer end of the piston-valve 17 with the diaphragm 15, which actuator, in the form thereof shown most clearly in Fig. 2 of the accompanying drawings, comprises a stud or main body portion 18, having a central depending screw-threaded projection extending through the central portion of the diaphragm, the actuator being firmly secured to said diaphragm by a nut screwed upon said projection and also having an outwardly-extending valve-actuating arm, which projects through a hollow extension 20 of the casing and is bifurcated at its outer end, as shown at 21, to form arms, which straddle a reduced portion 22 at the upper end of said piston-valve 17.

As a means for actuating the piston-valve in a direction to permit water or other motive fluid to enter the auxiliary conduit 7 and effect a closing movement of the primary valve F, I have provided a resistance device, shown as a spiral spring 23, which is seated in the spring-chamber $d^2$ and bears at one end against the outer face of the main body portion 18 of the secondary-valve actuator and at its opposite end against a tension-regulating device, which is herein shown as the hollow adjusting-nut 12, which is externally screw-threaded and is adjustably seated in the extension 10 of the cap 9 of the casing C.

For the purpose of guiding the secondary-valve actuator in its movements and also for holding the spring in proper central relation with the flexible diaphragm a guide pin or rod is secured into the upper face of the central portion of the said valve-actuator and extends through a perforation in the outer end of the adjusting-nut 12.

To render the resistance of the spring 23 equal to the maximum or predetermined air-pressure, which may be more or less, as desired, so that said spring will prevent the closing of the primary valve until the air-pressure exceeds the maximum or predetermined limit, it is simply necessary to adjust the nut 12 inward or outward, as circumstances may require.

To facilitate the escape of water from one end of the piston-cylinder 13 through the auxiliary conduit 7 after the primary valve has been closed and the flexible diaphragm has been depressed before the action of the spring 23 on the reduction in air-pressure in the air-chamber $d'$, an exhaust-opening 25 is formed through the wall of the bushing 6' and casing and communicates with the secondary-valve chamber 6, contiguous to the reduced portion 17' of said valve, and the port-closing end of said valve is so constructed that a slight depression of the diaphragm below its high-pressure position will uncover a slight portion of the port 7', which allows the water to pass into the chamber 6 above the port-closing end of the valve and out through the exhaust port or opening 25.

As a means for accelerating the closing movement of the primary valve F, positively insuring the tight seating of the same immediately upon the equalization of pressure above and below the piston which carries said valve on the opening of the port 7', which admits a portion of the motive fluid through the channel or auxiliary supply-conduit 7, I have provided a spring 26, which is seated within the hollow stem 14 of the piston, bearing at its lower end against the lower end of said stem and at its upper end against the partition 2 of the casing. It will be understood, however, that this spring 26 could be dispensed with, as the current of water passing through the outlet or discharge-conduit 4, augmented by the weight of the valve and piston themselves, would tend to close the same when the pressure at opposite sides of the piston is equalized.

The operation of the fluid-pressure regulator herein described is as follows: Assuming the supply-conduit 3 thereof to be connected with the service-pipe, the discharge-conduit connected with the supply-pipe of an air-compressing pump, and the air-conduit 16 connected with the compression-chamber of said pump, and assuming the spring 23 to be set to exert a resistance equal to the maximum or predetermined air-pressure—say seventy-five pounds to the square inch—water will enter the supply-cylinder beneath the piston-head 13 through the main supply-conduit, and the secondary valve being in position to close the port which controls the supply of water to the opposite end of the cylinder said piston will be held by water-pressure from below in an elevated position and the primary valve carried thereby will be held in a position to allow a continuous flow of water through the discharge-conduit to the pump for operating said pump. The diaphragm which controls the operation of the secondary piston will, while the air-pressure in the pressure chamber $d'$ is below the predetermined limit, be retained in a depressed position by the action of the spring 23, which is set to exert a resistance coinciding with the maximum air-pressure—that is, seventy-five pounds to the square inch. Immediately upon the rising of the air-pressure above the maximum or predetermined limit— that is, when the air-pressure is sufficient to overcome the resistance of the spring 23— the diaphragm 15 will be elevated, lifting the secondary valve, through the medium of the valve-actuator connecting said diaphragm and valve, to a position for establishing communication between the main supply-conduit 3 and the upper end of the piston-cylinder $d$ through the auxiliary conduit 7, this immediately equalizing the pressure exerted by the motive fluid above and below said piston and allows the primary valve F to close and shut off communication between the supply-chamber $d$ and stop the pump, the valve-actuating spring 26 accelerating the closing movement of said primary valve F, holding the same tightly to its seat at the upper end of the discharge-conduit 4. Immediately upon the reduction of pressure in the pressure-chamber $d'$ the flexible diaphragm 15 will be depressed and will shift the secondary valve 17 to a position for closing the entrance of fluid to the auxiliary supply-conduit 7 from the main supply-conduit 3 and will at the same time establish communication between the auxiliary conduit and the exhaust port or vent 25, allowing the water above the upper face of the piston-head to escape, whereupon the pressure of the water below said piston will at once lift the piston and open the primary valve to again start the pump.

Having described my invention, I claim—

1. In a fluid-pressure regulator, the combination, with a piston-cylinder having a discharge-conduit, of a piston snugly fitting in said cylinder and having a valve for controlling the flow of fluid through the discharge-conduit; a main and an auxiliary supply-conduit communicating, respectively, with opposite ends of said cylinder; a valve-chamber communicating with the main supply-conduit and having a port leading to the auxiliary supply-conduit; a diaphragm subject to air-pressure on one side and to spring-pressure on the other side; a secondary valve working in the valve-chamber and adapted for controlling the entrance and exit of fluid from the piston-cylinder from one side of the piston; and an actuating-connector between the secondary valve and diaphragm and said connector being adapted to operate the secondary valve to cause it to open or uncover its port to admit water to the piston-chamber and back of the piston when the diaphragm is operated by air-pressure.

2. A fluid-pressure regulator embodying a piston-cylinder having a piston snugly fitting in said cylinder; a pressure-chamber separated from said piston-cylinder and having a flexible diaphragm; a cap secured to the end of the piston-cylinder and having a discharge-conduit leading to said cylinder; a primary valve secured to the piston and adapted for controlling the flow of water through the discharge-conduit; a main supply-conduit and an auxiliary supply-conduit of different diameters communicating with the piston-cylinder at opposite sides of the piston; a secondary-valve chamber communicating with the main supply-conduit and having a port leading to the auxiliary supply-conduit, and also having an exhaust-port; a piston-valve working in the valve-chamber; a valve-actuator connecting the piston-valve and diaphragm and adapted to operate said valve on the movement of the diaphragm by air-pressure, whereby said valve will uncover its port to permit the entrance of water back of the piston; a spring bearing against one face of the piston-actuator and adapted normally for holding the piston-valve actuator in such position that the piston-valve will prevent the entrance of water to the piston from the auxiliary supply-conduit; and an air-supply conduit in communication with the pressure-chamber.

3. In a fluid-pressure regulator, the combination, with the piston-cylinder having a discharge-conduit and also having a main and an auxiliary supply-conduit of relatively different diameters communicating with said cylinder at different points in the length thereof and with a piston snugly fitting in said cylinder, of a pressure-chamber having a diaphragm and also having an air-conduit communicating therewith, said diaphragm being moved in one direction by the pressure of air at one side thereof; a spring acting upon the diaphragm with a resistance equal to the maximum or predetermined pressure of air; a valve cylinder or chamber communicating with the main supply-conduit and having a port communicating with the auxiliary supply-conduit; a valve working in the valve-cylinder and having its axis in parallelism with, and at one side of, the piston-cylinder; and a valve-actuator connecting said secondary valve and diaphragm and adapted to operate said secondary valve and cause it to uncover its port to admit water back of the piston when the flexible diaphragm is raised by air-pressure.

IRA H. SPENCER.

Witnesses:
EMORY C. WHITNEY,
HENRY BISSELL.